May 2, 1967  H. J. CATES, JR., ETAL  3,317,202
INCINERATOR
Original Filed Sept. 14, 1960  12 Sheets-Sheet 2

INVENTORS
HENRY J. CATES, JR
BY TOM ROSENBERG

Patrick F. Henry
ATTORNEY

May 2, 1967 H. J. CATES, JR., ET AL 3,317,202
INCINERATOR
Original Filed Sept. 14, 1960 12 Sheets-Sheet 6

INVENTOR.
HENRY J. CATES, JR
TOM ROSENBERG
BY

ATTORNEY

May 2, 1967  H. J. CATES, JR., ET AL  3,317,202
INCINERATOR
Original Filed Sept. 14, 1960
12 Sheets-Sheet 9

FIG.18

INVENTORS
HENRY J. CATES, JR.
BY TOM ROSENBERG

Patrick J. Henry
ATTORNEY

May 2, 1967 H. J. CATES, JR., ET AL 3,317,202
INCINERATOR

Original Filed Sept. 14, 1960 12 Sheets-Sheet 11

INVENTORS
HENRY J. CATES, JR
BY TOM ROSENBERG

ATTORNEY

May 2, 1967    H. J. CATES, JR., ET AL    3,317,202
INCINERATOR

Original Filed Sept. 14, 1960    12 Sheets-Sheet 12

INVENTORS
HENRY J. CATES, JR.
BY TOM ROSENBERG

Patrick F. Henry
ATTORNEY

United States Patent Office 3,317,202
Patented May 2, 1967

3,317,202
INCINERATOR
Henry J. Cates, Jr., De Kalb County, and Tom Rosenberg, East Point, Ga. (both of 416 Walton Bldg., Atlanta, Ga. 30303)
Original application Sept. 14, 1960, Ser. No. 56,015, now Patent No. 3,212,465, dated Oct. 19, 1965. Divided and this application Apr. 8, 1965, Ser. No. 455,357
2 Claims. (Cl. 263—33)

This is a division of our co-pending application Ser. No. 56,015, filed Sept. 14, 1960, for Incinerator, now Patent No. 3,212,465.

This invention relates to an incinerator and particularly to an incinerator of the continuous feeding and continuous operating type which is employed to burn refuse and to the method and apparatus employed in the incinerator arrangement using air and heat for continuously burning both wet and dry material in order to reduce it to a very fine ash which may readily be disposed of for various uses.

The characteristics of refuse is varied. It is often difficult to calculate the combustion characteristics of refuse, since refuse is a generic term usually meaning solid or semi-solid materials which originate as by-products of industry or as waste from domestic or commercial activities. Combustible refuse consists of such common, organic compounds as grass, tree trimmings, paper, cartons, woods, straw, carpets, rags, rubber, plastics, fats, oils, petroleum products and similar wastes. Chemically, this refuse is composed mostly of cellulose and lignin and in some sections of the United States, combustible refuse also includes incompletely burned ashes of such hard fuels as coal and charcoal. Similarly, garbage, mixed with other refuse, is often successively deposed of in well operated incinerators, provided the fuel value of the total mixture is maintained at a sufficient level. The molecules of each of these different compounds contain a specific proportion of carbon and hydrogen and the main sources of heat energy are represented by the carbon and hydrogen.

Among the many problems inherent in incinerating large quantities of refuse are the following:

(1) The control of hot gases within the interior of the plant and the utilization of them for pre-drying operation and other uses involves matters of air flow, hotter versus cooler gas flows, and other similar principles.

(2) The maintaining of temperatures within the chambers of the plant must be so that the operation may be uniform and so that the heat that is produced from the burning can be readily and directly used in the process.

(3) The matter of incomplete combustion, which is inevitable at times, and also the elimination of a large amount of unburned refuse.

(4) Difficulties in design and the use of test components so that maintenance and repairs can be performed very easily. There must be access to various parts and those parts which wear or deteriorate must be replaced while the plant is in operation.

(5) Various by-products are produced in the process of incineration and destruction of mixture of materials which provides a residue and ash, various scrap metals that are not consumed, and other materials which must be removed.

There are several methods in this country for disposing of refuse which includes garbage and other types of waste materials normally picked up from residences and commercial establishments. There is one primary difference between the refuse and waste material from the residences of the United States which is contrasted with that of other countries, particularly the European countries: The fact that garbage and refuse in the former is very much on the dry side because of the high bulk of dry paper and other materials, whereas the latter is more of the wet type garbage which is more difficult to burn, but at the same time is easier to control at its burning. The use of kitchen garbage disposal units in the American home contributes to the elimination of some of the wet material from the refuse which causes the refuse to be even more on the dry side with a good bit less moisture. Therefore, any domestic incinerator operation which takes refuse from the residences and reduces it to a fine ash must take into consideration in its operation the burning of a good bit of highly combustible and highly burnable material and the absence of some of the moisture which has been present in other types of garbage. All of these continuous incinerators operate on the principle of collecting the garbage at one central point near the entrance to the incinerator and then picking up the garbage by large cranes or trucks or in some other manner and feeding it into the entrance into the incinerator in a continuous, straight line pattern, keeping a constant supply of refuse flowing into the entrance into the incinerator. This material must be pre-dried to a certain moisture content in order to control the process and in order to reduce the material in the proper manner to the desired ash at the end of the process.

The present invention relates to an over-all improvement in the method and apparatus employed in refuse incinerators. The instant methods employ the continuous feeding of the refuse and the pre-drying thereof with further tumbling and conveying of the material through ignition grates where about one-half of the burning takes place. Hot gases produced from the burning on the ignition grates are diverted back into the refuse entering the material on the pre-drying grates. The refuse itself is passed from the ignition grates into a rotary kiln where it is tumbled, by which action the refuse is agitated in such a manner which enables it to be completely destroyed. At the end of the rotary kiln, the small ash is spilled into a residue conveyor and removed from the scene, either by trucks or by any other suitable method.

Generally described, the incinerator is a continuously operated and continuously fed apparatus adapted to burn mixed refuse continuously as it is fed. The various incinerator units as sub-combinations are: the feed chute; the pre-drying or simply drying grates, whereat the refuse is spread and dried to some extent; the ignition grates, at which point the refuse is actually burned or ignited and partially destroyed by burning; the water seal chamber, by which hot ash is quenched and moved; the rotary kiln, at which place the remainder of the refuse from the ignition grates is tumbled and burned to an ash; and the mixing chamber. The method employed is that of mixing the refuse in the collection or depository area, then feeding the material on to drying grates, which spread the material, and at the same time introducing hot air or gases across the material to evaporate some of the moisture therefrom. The method then encompasses transferring the material into ignition chamber in which there is located a particular arrangement of ignition grates adapted to spread the refuse across the length thereof and to ignite and burn it as it moves. From the ignition grates, the material is rotated and completely burned in a rotary kiln which produces gases that are employed in the method to pre-dry the refuse in the drying grate stage.

All of the individual elements or apparatus of the present system are placed together in one composite arrangement inside a building structure and are inter-related in a continuously fed and continuously burning operation connected by suitable passageways and duct work properly sealed and joined to provide a composite and continuous method and apparatus of incinerating refuse from the beginning with the partially wet refuse to the end where there is a fine ash. Generally described, the apparatus consists of a feed chute arrangement employing a sand seal and a reverse taper and a particular arrangement of air seal; drying grates upon which the refuse is fed and partially dried and which grates comprise longitudinal stringers, alternate sections driven by a rocker arm assembly employing wear pads and replaceable grate bars, together with a special air or water cooled beam and a reinjection conveyor system which removes and conveys the siftings from under the drying grates and discharges it back into the furnaces for burning; a bypass arrangement which removes odoriferous gases by a special baffle air-cooled arch in the ignition grate chamber; ignition grates which employ a number of novel and useful elements, including individual shearpin arrangement, seal arrangement on the pressure arms, alternate reciprocating longitudinal stringers, wear shoes and hold-down assemblies or rocker arm assemblies, the rotary kiln in which the refuse is finally burned to a fine ash which includes such worthwhile arrangements as a kiln seal, a spring plate mounted girth gear, water cooled trunnions and a segmented kiln discharge casting; and a mixing chamber.

In a preferred embodiment, the ignition grates are designed to burn about half the rated capacity, providing heat for the drying grates, and also for the burning operation in the rotary kiln. The rotary kiln shall completely consume the balance of the refuse and the moisture laden gases from the drying grates by-pass the rotary kiln and are reheated in the mixing chamber to control the odor thereof. The preferred unit is capable of operating entirely without manual stoking and produces a fine, completely consumed residue which can be processed to reclaim metals and useful by-products.

The operation of the instant method and apparatus is as follows:

First, garbage and refuse is delivered by collection trucks into a storage pit. This allows cranes to select and mix refuse to assist in creating the best burning condition in the furnace.

The refuse is hoisted from the storage pit by cranes with grab buckets to a feed hopper. From the dumping pit to feed hopper, the process is intermittent, but from the hopper to the final loading of residue onto the trucks for disposal, it is a continuous process.

From the hopper, garbage and refuse is fed into a pre-drying chamber where drying is done by radiation from the ignition chamber, below and after the drying chamber. A portion of the hot gases from the ignition chamber rises and passes over the wet garbage and refuse. Then they are conducted to the combustion chamber by a separate by-pass duct over the rotary kiln. From the drying chamber, refuse moves into the ignition chamber by means of mechanically operated grates, the speed of which can be varied to suit desired rates of combustion. Pre-heated air is then introduced beneath the fuel bed or the ignition grates. This pre-heated air is controlled by the operator to meet the requirements of combustion. The air pre-heated may be built into and to form a part of the furnace sidewalls.

By means of the mechanically operated grates, the partly consumed and burning garbage and refuse is fed into a slowly revolving, inclined kiln, the speed of which may be varied to suit the desired conditions. The slow cascading passage through the kiln exposes unburned refuse continuously to hot gases from the ignition grates and completes incineration. Hot gases from the kiln pass into a mixing chamber, where they unite with gases from the drying and ignition chambers. Here combustion of all gases is completed before they proceed to the stack, or boilers. Simultaneously, from the dumping zone of the kiln, residue is placed onto a slow moving conveyor which is submerged in water. This thoroughly quenches the residue as it is carried outside to a processing point where metals can be removed and the remaining residue can then be hauled away by trucks for use as a sub-base for streets, parking lots or permanent fills. From the time it enters the feed chute until it is dumped as residue, the refuse and garbage is in continuous motion. Thus, it cannot form huge clinkers but remains in comparatively small, dense particles, thereby producing a residue which is ideal for road building, subgrade or land fills. Panel boards are provided for complete control of every stage of the process and on them are mounted pyrometers, draft gages, electronic controls for motors, smoke recorders and other operating controls.

In the ensuing descriptive material, the over-all method and the complete apparatus is shown and described both in diagrammatic views which are diagrams of a complete plant shown by a section view therethrough and in other views which show sub-elements and their details.

A primary object of this invention is to provide a method of incineration which continuously disposes of large amounts of refuse, and which reduces it to a fine size and small quantity which can be removed from the system.

Another object of this invention resides in the particular arrangement of the component chambers and parts of the plant, whereby gases produced in the combustion of the materials may be utilized to best advantage and whereby various pressure differentials may be controlled for the best operation of the system.

Another advantage of this system resides in the various component parts thereof, including the chambers in which pre-drying and combustion and complete drying take place, as well as the pre-drying grates, the ignition grates, the rotary kiln and other portions of the over-all system.

An additional object of this invention may be found in the arrangement of the movable and stationary grates and mechanical structure associated therewith, which provides a particularly advantageous type of drying grate.

Still another advantage of this invention is found in the ignition grates, wherein the major ignition of the refuse takes place and including such novel and worthwhile things as the individual shearpin arrangement, the movable and stationary ignition grates, the wear shoe and rocker arm support arrangement and other features of this particular portion.

In the ensuing drawings and description, reference is made from time to time to various elements of the over-all method and apparatus. Following a description of the method employed and the apparatus as a whole, there are specific numerals assigned to represent a particular portion of the system and a special part of the specification is used to describe these various sub-combinations in detail. All of the numerals of a certain group, for example, will begin with the same digit so that the parts may readily be identified with respect to which element they belong. Preliminary to this, it is pointed out that the ignition grates receive the refuse from the drying grates, and, therefore, reference is made from time to time to drying grates and ignition grates and it is to be understood that these are not the same grates. Furthermore, both the ignition and drying grates employ movable and stationary grates. The drying grates are mounted within a specific area which is generally known as the "drying chamber" and the ignition grates are mounted within an area of the plant which is referred to as the "ignition chamber" and while these chambers are open to one another and connected by various heat and air ducts, it is to be understood that they refer to the particular chamber in which these particular elements are located. The complete system, method, apparatus and various sub-combinations are easily adapted to be contained within a special plant or building having an exterior resembling a building structure of whatever materials and with whatever ornamentation and originality is desired and for all practical purposes, the system may be considered a continuous operating plant which is housed in a building structure having various compartments and chambers connected together to direct the refuse from its original state at the beginning until it is burned to a fine ash at the end.

With respect to our previous mention of chambers within the plant, it is pointed out that the movement of refuse during the process from one chamber to another presents a particular problem since it is necessary to join such chambers by some means sealing the gases and heat from other portions of the plant. One particularly novel thing in my invention is found in the air seal between the open feed chute and the drying chamber employing a sand seal between the feed chute and a reverse taper on the feed chute to provide easy passage of the refuse to prevent blocking of the chute.

Other and further objects and advantages of our invention will become apparent from the following description taken in conjunction with the accompanying drawings, wherein.

Figure 1:
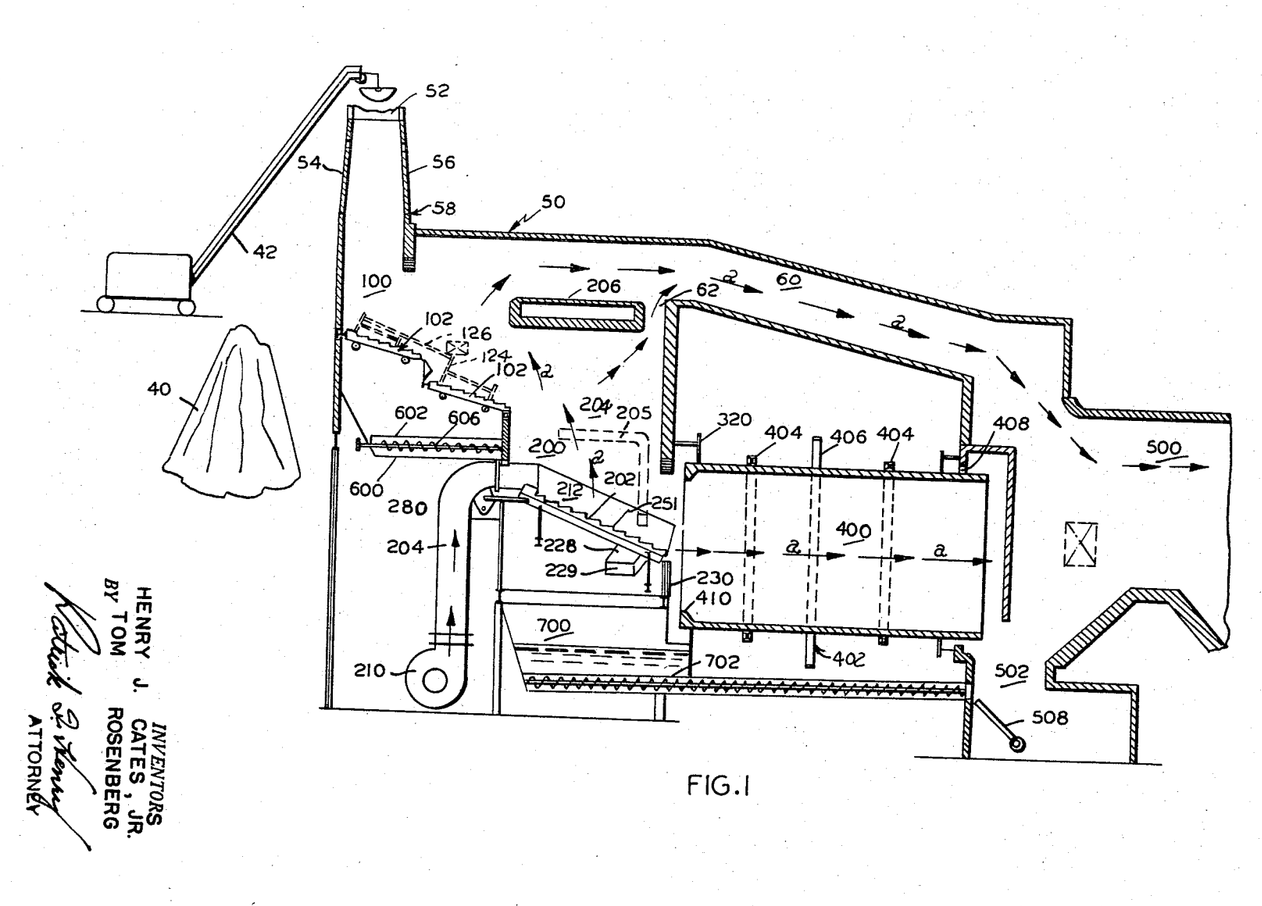
FIG. 1 is a vertical cross-sectional view through a typical plant using the method and apparatus of the present invention with the air and gas flow shown by light lines with arrowheads thereon.

Referring initially to FIG. 1 of the drawings for a description of the plant and the operation thereof as a whole and the relationship between the individual elements of the plant as well as the air flow and hot gas flow therein, it is seen that the refuse 40, which is stored outside the plant, is picked up periodically from time to time by means of a travelling crane 42, or by a conveyor system (not shown) or any other suitable means, and fed in increments into the entrance to the plant 50, through a chute 52 having diverging walls 54, 56 and a bottom which is connected to a drying chamber designated by number 100. Chamber 100 has positioned for operation therein a pair of drying grates 102, the details of which will be described later on under the heading "Drying Grates."

In the following description, various number groups have been assigned to particular elements, to wit: the plant itself and component structure are identical in the group between "50 and 99," all of the numbers in the "100" group refer to drying grate parts, while the ignition grate chamber and ignition grate structures are identified in the "200" and "300" group, the rotary kiln and attendant structure and parts are identified in the "400" group and the mixing chamber and its structure is identified in the "500" group, except for that portion of the chamber which is actually a part of the plant structure and for some parts which may overlap different groups. The duct work and other connections which are located between two elements will carry the group legend depending upon which group it is more closely associated with from the standpoint of clarity.

Leading from the incoming chute 52, there is a sand seal joint structure identified generally as 58, which is shown in detail in FIG. 2 and which will be described later on with particular emphasis on the details of construction. The refuse 40, dumped through the chute 52, falls into the first chamber of the plant 50 which is a pre-drying chamber 100 having drying grates 102 located therein. Refuse dropped on top of the upermost drying grate 102 is continuously circulated and moved down the stair-step arrangement of the grates which are reciprocated by a power-driven connection means that will be described later. Following the pattern of FIG. 1, it is seen that the refuse is carried down the upper and lower driving grates and dropped into the ignition chamber 200 which has the ignition grates 202 located therein. For the time being, the details of the grates 202 will not be discussed and will be covered later on under the particular heading of "Ignition Grates."

The upper portion of the ignition chamber 200, represented by the numeral 204, connects on one side with the drying chamber 100 and connects to the rotary kiln 400 by a particular seal plate arrangement 320. This seal 320 assures an air seal between the ignition grates 200 and rotary kiln 400; and has arranged transversely thereacross a flat baffle arch 206. In the pre-drying period, the refuse is pre-dried beneath the feed chute as it is moved slowly by means of the movable grates 102 toward the second or ignition chamber 202. The movable grates 102 of the drying chamber 100 alternate between stationary grates, as will be apparent hereinafter, and the arrangement includes two continually moving and reciprocating grate sections mounted on a slight angle with the horizontal to provide a downward movement and to cause a tumbling action which gives the advantage of exposing all refuse surface to hot gases for pre-drying. In FIG. 1, as pointed out hereinbefore, the light lines with arrowheads thereon and the indicia a, represent generally the flow of air and gases throughout the plant, and it is noted that the hot gases and air which flow from above the ignition grates 202 are directed back somewhat into the pre-drying chamber 100 above the pre-drying grates 102, thereby aiding the drying of the refuse passing thereacross. The movement of these gases and this air from the ignition grates 102 is aided measurably by the presence of the baffle arch 206 located above the ignition grates 202.

In conjunction with the ignition grates 202, in order to provide air which is necessary for good combustion of the refuse, there is suitable duct work 204 extending vertically in the building space below the drying grates 102 and attached to the upper end of the ignition grates 202 drawing primary air through a blower 210 and passing it by force through the duct work 204 into the sides and beneath the ignition grates 202, as will be more apparent hereinafter. It is this air from the duct work 204 which passes under, then up through the ignition grates 202 and bed of refuse and across the ignition grates 202 thus mixing with the gases produced thereat and rising above the bed of refuse. Additional air is taken off from the duct system and relased over the burning bed of refuse by the over fired air system 205 on both sides of the chamber 202 involving a particular arrangement of ignition assembly which will be described later on. The refuse is moved along the ignition chamber by use of the movable grate sections, which alternate between stationary grate sections. The duct system 205 provides air over the refuse bed. The duct system is located on both sides of chamber 200 and the air flow is controlled by dampers.

The baffle arch 206 is constructed from suitable fire brick and structural material over the ignition grate chamber and serves as a deflector to direct the hot gases over the bed of refuse on the drying grate.

The gases are then directed across the top of the baffle 206 and through a structural passageway 60 formed in the building structure into the chamber 500 to be described later on. Some gases from beneath the baffle 206 pass up through a small passageway 62 and join in the chamber passageway 60 with gases passing therethrough. As the refuse passes across the ignition grates 202, the grates are protected by a special construction of the sidewall castings to protect the side walls 212 of the ignition chamber 200 from the burning of the refuse. In addition, the side wall castings 212 are protected from the heat of the chamber by the forced draft air that passes back of them and cools the castings. The particular supports for the grates and the operation thereof, including a rocker arm method or a wear shoe method, will be described later.

From the ignition grates 202, whereon the refuse is constantly agitated and turned downwardly, the burned material is dropped into the rotary kiln 400 for the remainder of the burning operation. Kiln 400 is connected to the chamber 200–300 and driven by a particular gear arrangement 402 which will be described in detail in conjunction with a description of the rotary kiln parts in FIGS. 21 through 25 and it will suffice for the present to say that the kiln is rotating constantly and is supplied with burned material from the ignition grates 202 and with a quantity of hot gases and air a entering the kiln directly from the surface of the bed of the burning refuse. The remainder of the burning of the refuse takes place within the kiln 300 and the discharge end of the ignition chamber is protected from the heat by castable refractory mounted on a discharge casting arrangement, the details of which will appear later. The hot gases that result from the burning of refuse in the ignition chamber 200 are utilized for pre-drying of the refuse in the drying chamber and are odorless in character. To remove the odor from these gases, they are directed over the rotary kiln by the by-pass duct 60 which spills the gases into the chamber 500 following the rotary kiln discharge end. This chamber 500 mixes the gases at a sufficient temperature to remove the odor from the hot gases. The mixing chamber 500 is so designed to cause turbulence by means of the bridge wall 506 within the chamber 500 and the offset wall 504 of the chamber according to a more detailed description to follow. The refuse, as it is received by the rotary kiln 400, is tumbled to expose all surfaces of the refuse to the hot gases and to complete the burning of the refuse. The rotary kiln is driven by a main drive gear which meshes with a girth gear mounted around the rotary kiln. The ash, as it is discharged from the end of the rotary kiln 400, is dumped into the diversion gate housing 502 which drops ash onto a diversion gate 508 and into one of several residue conveyors. When properly installed and operated, the incinerator unit or plant shall be capable of operating entirely satisfactorily without manual stoking and shall produce a fine, completely consumed residue or ash.

Feed chute

Figure 2:
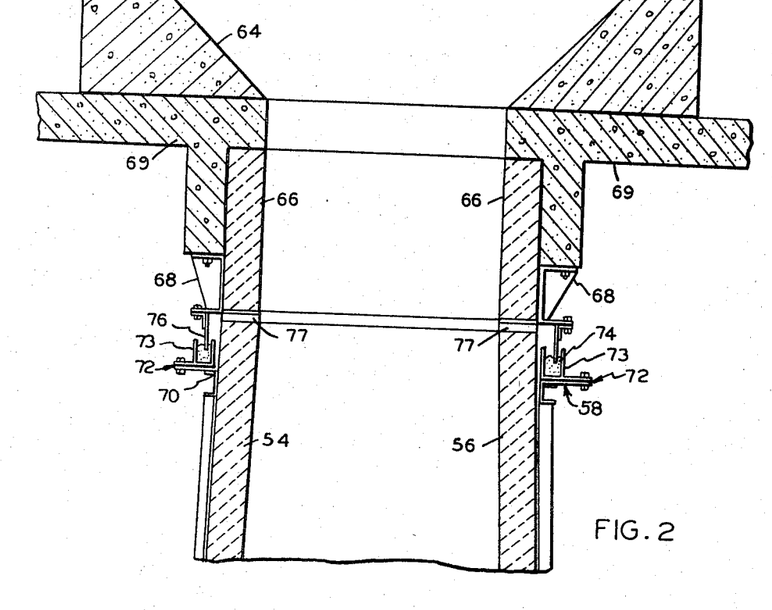
FIG. 2 is an enlarged vertical cross-section taken substantially medially along the sand seal connection between the open feed chute and the drying chamber found in the upper left hand extreme side of FIG. 1.

The feed chute 52, preferably of refractory material, as shown in FIGS. 1 and 2, employs a top hopper portion 64 with an open top into which the refuse is fed. The top 66 of the feed chute is connected by a continuous U-channel member 68 bolted to the under side of the building structure 69.

The bottom side walls 54, 56 of the diverging feed chute has affixed on the outsides thereof a continuous, peripheral channel member 70, to which is bolted a connecting plate arrangement 72. A trough-like channel plate arrangement 73 on plate arrangement 72 holds a quantity of loose sand 74, into which is fitted a protruding plate 76 attached to the channel 68, at the top portion of the feed chute 66, thus connecting the top of the feed chute 66 to the lower part of the feed chute 54, 56 so that expansion may take place. An expansion material, of asbestos or the like, is placed between the upper portion 56 and the upper edges of the side walls 54, 56.

The taper of the sides of the feed chute 54, 56 provides for the movement downward of the refuse in the chute without blocking same. The expansion material 77 provides for expansion and contraction as the sand seal plate 76 moves up and downward.

Drying grate assembly

Figure 3:
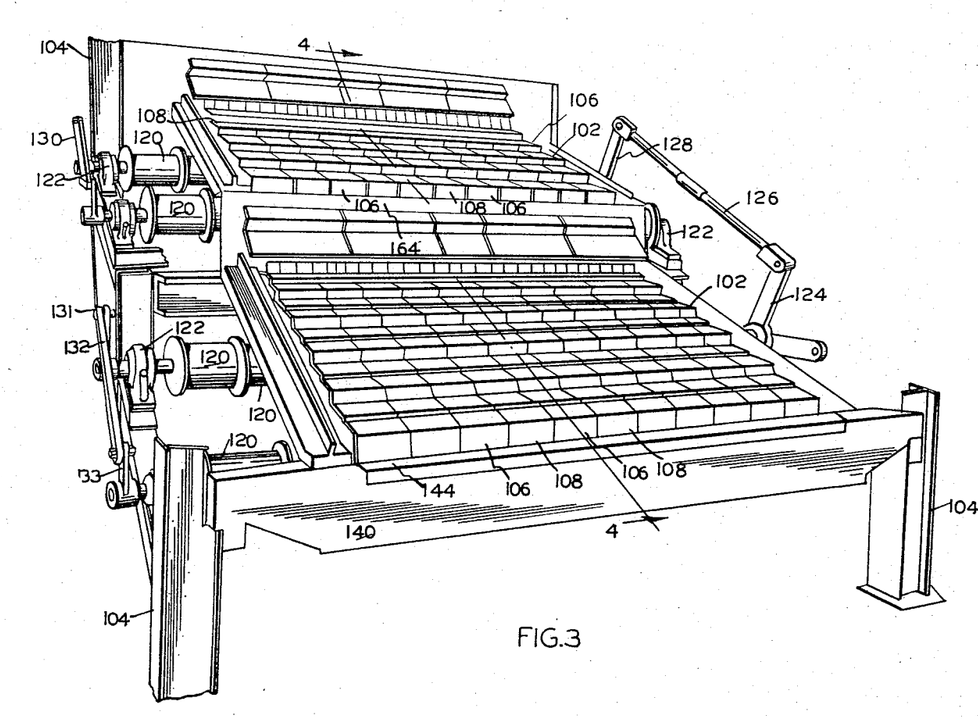
FIG. 3 is a front perspective view of the drying grates contained within the drying grate compartment below the feed chute in FIG. 1.

Referring now to FIG. 3 for the details of the drying grate assembly 102, the entire assembly is supported on a plurality of frame members 104 of I-beam construction or other suitable construction which are suitably supported on its own foundation within the building structure itself and held in place as by bolting or any other conventional construction method. In the present embodiment, there are two drying grates 102 supported on the frame members 104 for operation thereon and each comprises a plurality of stair-step and side-by-side grates, movable grates 106 and stationary grates 108. Reference numbers 106, 108 constitute the entire assembly of moving grate 106, stationary grate 108. They have subcomponents which will be described in detail later.

Figures 4, 5, 7:
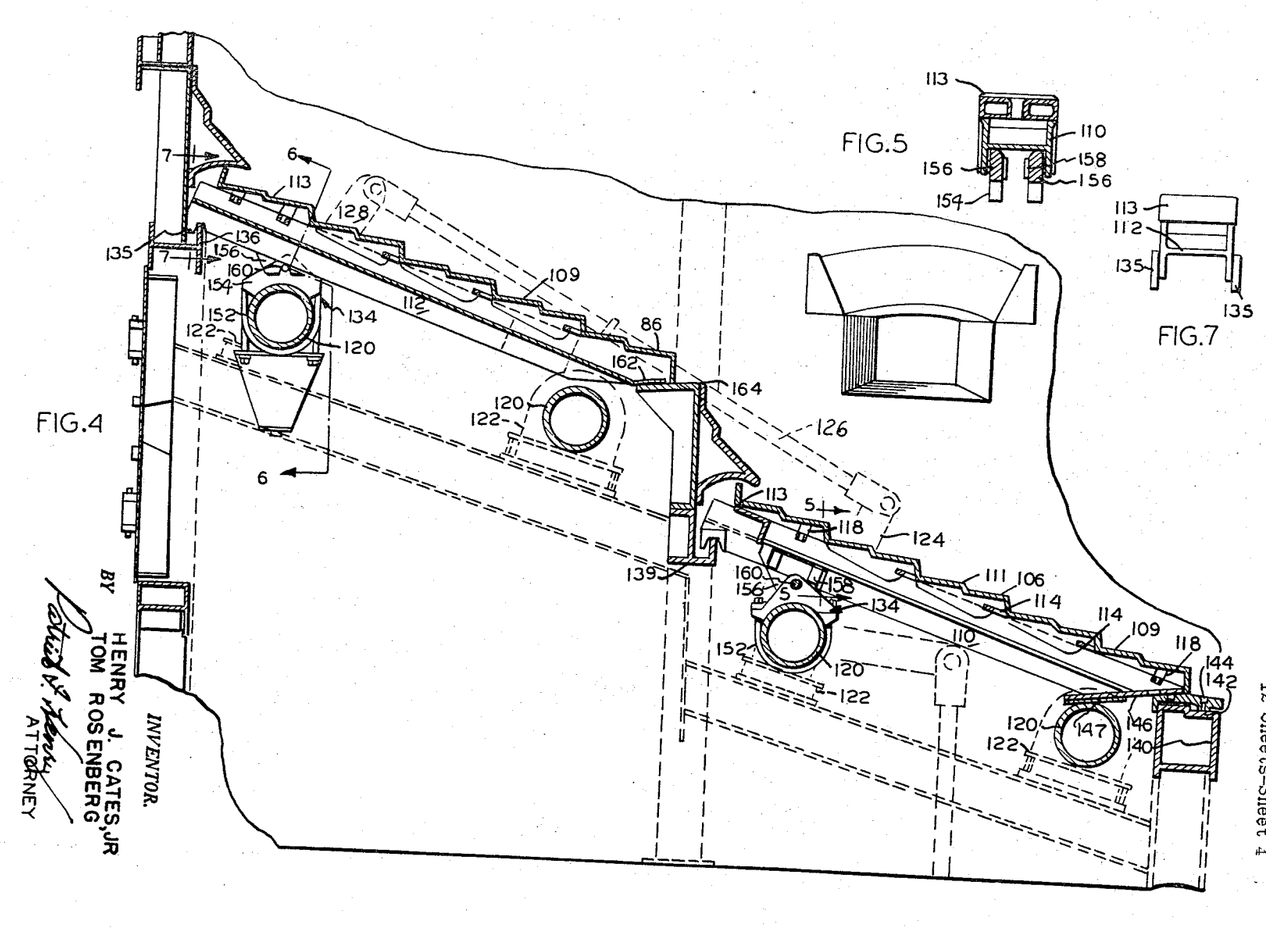
FIG. 4 is a longitudinal cross-sectional view through a movable grate taken substantially along line 4—4 in FIG. 3.
FIG. 5 is a cross-sectional view through one movable grate taken substantially along line 5—5 in FIG. 4 and with parts removed.
FIG. 7 is an end view of one stationary grate taken substantially along line 7—7 in FIG. 4 and with parts broken away.
Figure 6:
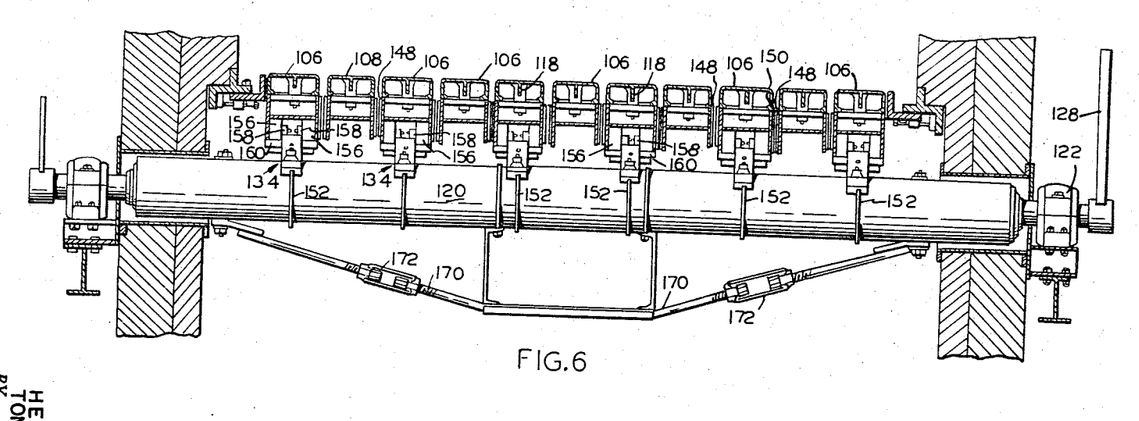
FIG. 6 is a cross-sectional view taken substantially along line 6—6 in FIG. 4.

Starting substantially in the center of the grate structure 102 in FIG. 3, the center grate 106 is a movable grate, the next grate 108 is a stationary grate and so on, alternating from one to the other to the outside of the structure. The grate surfaces are plate-like members cast in step formation as shown in FIGS. 3, 4 and 6. The movable grate 106 has an elongated stringer 110 which supports different grate plates 109, 111, 113. Stationary grates 108 are mounted on stringers 112. Grate plates 111 are affixed to stringers 110, 112 by means of lugs 116 which are a part of the stringers 110, 112. These grate plates 111 lock to the stringers by the lugs 116. Grate plates 109, 113, being at the front and rear end of the stringers 110, 112, are affixed to the stringers by bolts 118 which fasten the plates to the stringers 110, 112.

Mounted on the frame 104 of the drying grate assembly 102 and extending transversely thereacross is a plurality of drive roller or cylinders 120 journaled on opposite ends in journals 122. A bell crank lever 124, driven by suitable motor drive (not shown) is connected by a connecting rod 126 with a second crank arm 128 attached to the upper most drive cylinder 120 on one side of the frame. On the other side of the frame, drive cylinder 120 is connected with the next lower drive cylinder 120 by means of a connecting rod 130. On that same side of the frame, an arm 131 on the uppermost drive cylinder 120 of the lower grate set, which is driven directly from the bell crank 124, is connected by suitable linkage 132 to drive an arm 133 on the lowermost drive cylinder 120. All of the drive cylinders 120 are adapted to drive the movable grates. Referring to FIG. 4, it may be seen that a pivot bracket assembly 134 attaches each of the movable stringers 110 to a respective drive cylinder 120 and each of the stringers 110 is supported at an upper and lower position on the drying frames.

The stationary grates 108 shown at the top of FIG. 4 are stationarily mounted by means of a notched bracket assembly 135 supported on a transverse beam 136 of the drying grate frame.

With the foregoing arrangement, power applied to reciprocate the bell crank 124 is transferred to all of the drive cylinders 120 which reciprocate the movable stringers, thereby moving the movable grates 106 positioned thereon respective to the alternative rows of stationary grates 108.

Figure 8:
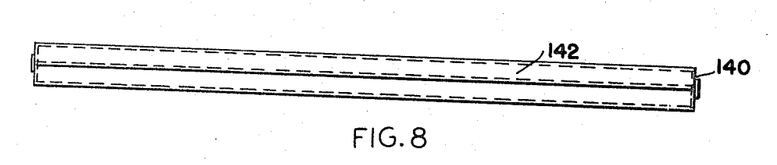
FIG. 8 is a top plan view of the air cooled beam which supports the lower end of the grates in FIG. 3.
Figures 9, 10:
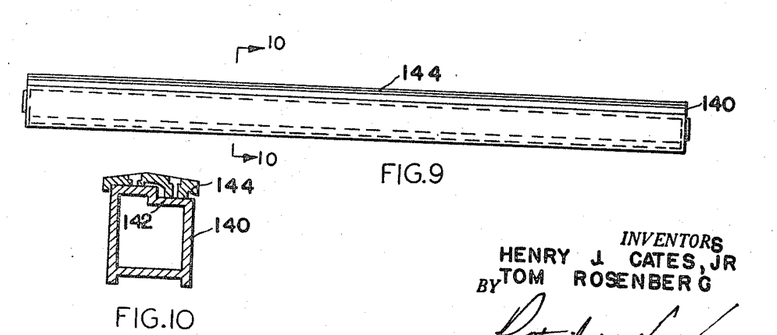
FIG. 9 is a front elevation view of the beam shown in FIG. 8.
FIG. 10 is a cross-sectional view taken substantially along line 10—10 in FIG. 9.

The lowermost end of the lower grates 106, 108 rest upon and are supported upon an air cooled beam 140 of elongated box-like construction and having a stepped upper surface 142 upon which is positioned a notched fastening wear-shoe member 144, on which the lower ends of grates 106 slide and the grates 108 rest. Member 144 is an elongated wear pad bolted to the top of the air cooled beam 140 and has resting thereon all of the bottom edges of all of the moving grates 106. The bottom of each of the movable grates 106 is bent underneath itself into a ledge 146 which has attached thereto a wear plate 148 resting upon the top of the lower drive cylinder 120. The front portion of the underside of the grate 106 rests on the top of the wear pad 144 which is bolted to the air cooled beam 140.

Each of the movable stringers 110 are attached to the upper shaft 120 by means of the brackets 122 and each is provided on the sides thereof with wear pads 148 which bear against and slide against wear pads 150 attached to each of the sides of the stationary stringers 112. All of these pads may be removed and replaced after they have worn beyond use and wear pads 148, 150 protect the stringers 110 and grates 106 from wear and damage and protect the stringers 110 from wear at the sides thereof. According to this arrangement, only the wear pads 148, 150 are replaced and the stringers 110 will provide considerable longer service.

The movable stringers 110 are supported upon a top drive roller shaft 120 by means of the pivot bracket assembly mentioned previously. The bracket assembly comprises a U-bolt 152 bolted with a cap block 154 having slotted blocks 156 resting thereon. The bottom of each of the movable stringers 110 is H-shaped and it rests on the top of the cap 154 and with the spaced block members 156 inside thereof. A pair of anchor pins 158 attach the slotted blocks 156 to the inside of stringers 110. Cap block 150 has a pivot pin 160 fitted into the slots in blocks 154. According to this arrangement, the drive shafts 120 reciprocate and the support between the block members 156 on the pivot pin 160 is a rocker connection assembly which transfers the motion of the shaft 120 to rock or reciprocate the stringers 110, thereby moving the movable grates 110 in an inclined play upwardly and downwardly substantially to the dotted line position shown in FIG. 4.

A wear shoe 162 on the bottom of the upper movable grate 120 wears against a support beam 164 transversely fastened across the frame of the drying grates between the upper drying grates and the lower drying grates. The movement of the lower drying grate 106 is against the wear shoe member 144 by the underside 146 and the wear shoe plate 148 attached thereto.

The center portion of the drive shaft 120 is resisted from buckling by means of a support arrangement comprising a pair of rods 170 adjustably fastened together by means of turnbuckles 172 and being attached between the ends of the shaft 120 and the center of the shaft 120.

*Ignition grates*

The ignition grates structure is designated generally as 200 and 202 in FIG. 1 and the particular ignition grate parts are all in the "200" and "300" series. It is noted, as described previously, in the process in FIG. 1 that the refuse after being moved across the drying grates 102 is directed by the drying grates 102 onto the upper entrance to the ignition grates 202, which in similar fashion to the drying grates 102 move the refuse slowly down a stair-stepped arrangement, drying it across the top and under the bottom, at the same time igniting and burning the refuse as it is moved down the incline.

The details of the ignition grates 202 are shown in FIGS. 11 through 20 and this material will now be described. The ignition grate structure is mounted on a network of longitudinal beams 204 and vertical beams 206 of the heavy I-beam type welded or otherwise fastened together to form a structural support for the ignition grate structure 202 inside of the ignition compartment 200. The support structure for the ignition grates 200 is independent of the building and has its own foundation.

The entrance or elevated end 208 of the ignition grate structure is covered by a vertical plate member 208 having opening 210 that serves as ports whereby the siftings from the drying grates are collected in a hopper and conveyed back into the ignition chamber through these parts. The siftings hopper is located in FIGURE 1, designated 600. This recharging system provides for the continual re-entry of all the siftings from under the drying grates 100 into the ignition chamber 200 therein. The sidewalls of the grate structure (as seen also in the cross-sectional view in FIG. 19) are composed of a plurality of removable and replaceable grate sidewall castings or casting plates 212, which together with an exterior steel plate wall 214, attached on the outside of the ignition grate structure, form a chamber.

Figure 16:
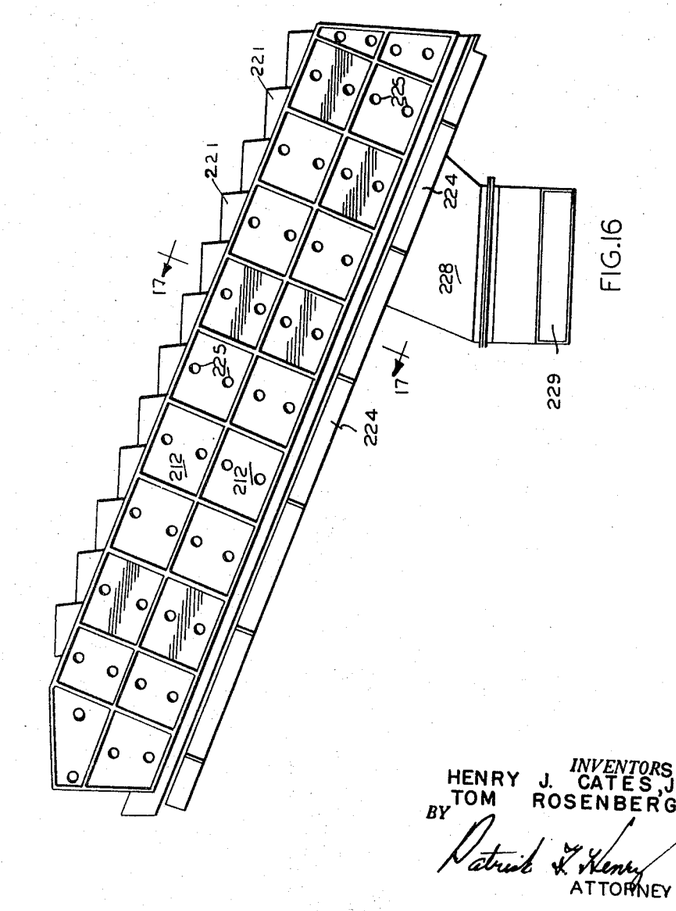
FIG. 16 is a side elevation view of one of the ignition grate sidewall castings.
Figure 17:
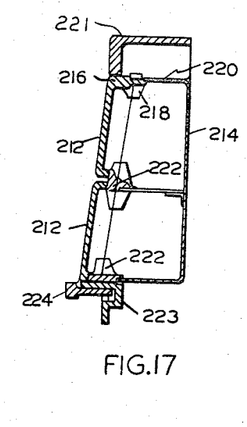
FIG. 17 is a cross-sectional view of the ignition grate sidewall casting taken substantially along line 17—17 in FIG. 16.

Referring to FIGS. 16 and 17, each casting or plate 212 has an upper lug or protrusion 216 with a tip 218 fitting about the inner upper edge of the interior projection 220 of the outer wall 214. Optionally, auxiliary support members 221 attached on top of casting 212 on protrusion 216 and over projection 220 (see FIG. 17) provides a base support for any refractory material of the ignition chamber used to cover and protect the sides. Bottom plates 212 have an upper projection 222 fitting inside of the upper plate 212 and closing the gap therebetween. The bottom of the bottom casting 212 fits into the inner end of the outer wall 214 and rests upon a longitudinal structure support 223 fastened to the beams 204, 206 of the over-all grate support structure. With this arrangement, the upper or lower sidewall castings 212 may be removed individually and replaced when unduly worn. Side wall casting piece 224 is a casting that allows for the adjustments between the side wall castings 212 and the grates. The very smooth, finished surface of castings 212 against which the refuse passes as it is moved downwardly across the ignition grates assures a more positive and smooth flow of the burning refuse preventing most of the large clinkering which has occurred in other types of ignition arrangements. Each sidewall casting 212 is provided with a plurality of normally sealed bolt openings 225 closed by bolts anchoring the side wall castings 212 to wall 214.

Both sidewalls of the ignition grate structure are provided with an elongated duct 226 extending from an opening in the front plate 208 downwardly along and against and communicating with the sidewall casting structure on that side and having an auxiliary duct 228 extending downwardly and terminating with an opening adjacent the underside of the ignition grate structure beneath the support beams 204. According to this arrangement, the mouth or terminal opening of the duct 228 exhausts air beneath the ignition grates, thereby supplying air that passes up through the grates, thus providing air for the combustion.

The ducts 226, 228 are provided with a damper 229 which may be used to control the volume of the air flowing therethrough. The front, or downward end, 230 of the ignition grate structure 202 is constructed in a particularly unique and advantageous manner. Member 230 is an end plate for the side wall duct work. Plate 234 is a semi-circular plate that forms an interconnecting seal with the rotary kiln 400 and the ignition grate 200.

The semi-circular portion 231 has attached to the bottom thereof a bottom plate 232 formed with a seam in the center thereof and being bolted to the two semi-circular flanges 234 attached thereto. The discharge castings 236 are flat metal plates and as seen in the cross-sectional view in FIG. 17, each of these plates is bolted to an inside facing 238 attached rigidly on the frame of the ignition grate. Accordingly, the top portion 239 and the main body of discharge castings 236 may be removed from the front of the ignition grates and replaced after they have received the maximum wear.

The ignition grates themselves are designated generally by the numerals 240 and 242 representing, respectively, the stationary grates and the movable grates arranged similar to the drying grates described previously. As is readily seen in FIG. 13, the movable grate structure 242 comprises an elongated stringer 244 of beam-like construction having a plurality of spaced bolt holes 246 formed in the upper surface thereof into which are fitted the spacer bars 248 on which fits a lug 250 of a basket casting member 251, each of stepped construction and having a front end overlapping the rear end of a succeeding lower basket member. All of the basket members 251 are removable individually from the stringer 244 so that they may be replaced when worn, broken or otherwise unserviceable. Each basket 251 has two sides and supports thereon ignition grate bars 253. Each stringer 244 is adjacent to a stationary grate 240 supporting stationary grate bars 254 in identical fashion to the arrangement shown in the preceding drying grates. The movable ignition grates 242 and stringer 244 are rocker-mounted for movement on the frame structure 206 by a rocker-mounting arrangement 258 now to be described.

Figures 13, 14:
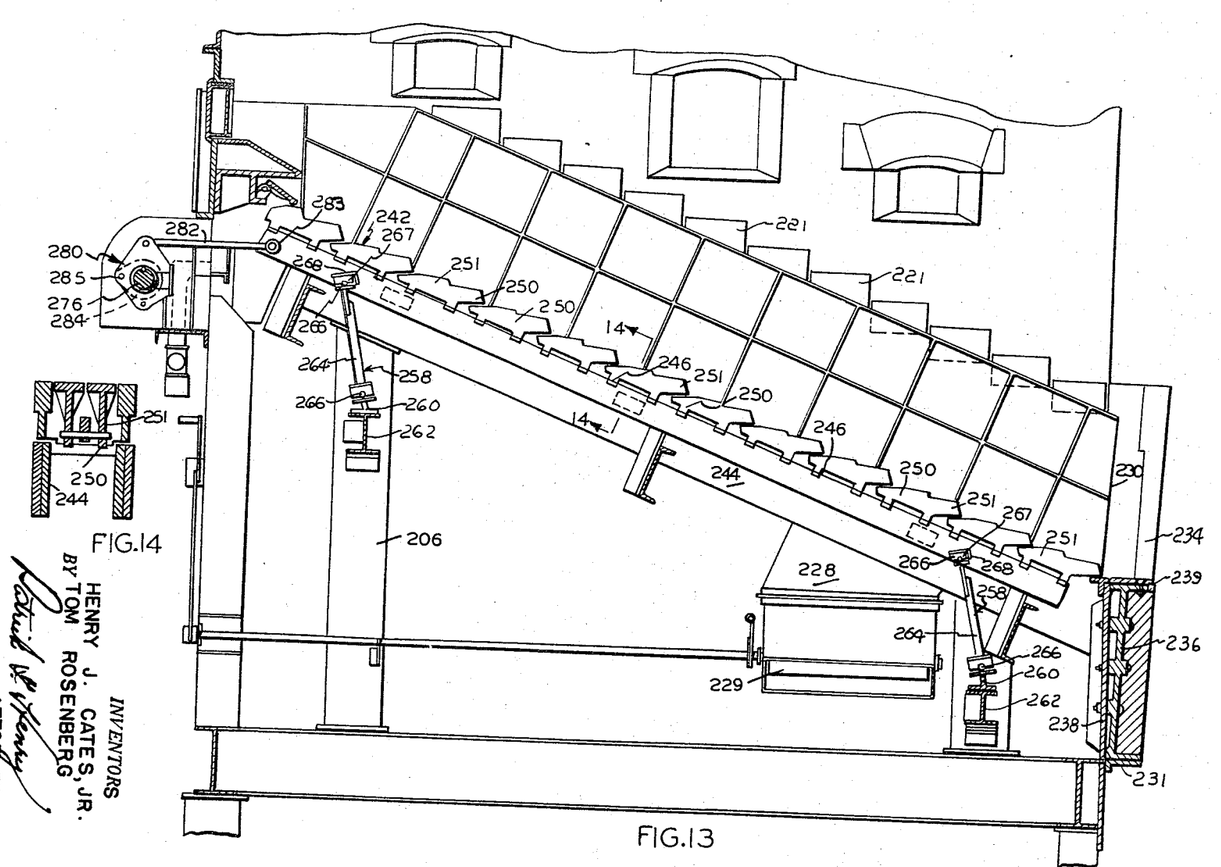
FIG. 13 is a side elevation view of the ignition grate assembly shown in FIG. 11 with one side of the duct removed to expose the grates.
FIG. 14 is a cross-sectional view taken substantially along line 14—14 in FIG. 13.

Rocker-mounting arrangement 258 is mounted upon a support 260 attached to a cross I beam 262 on the frame 206 and comprises a support arm arrangement shown in detail in FIG. 13. An arm or upstanding member 264 has a ball 266 attached on each end thereof which fits into a socket arrangement 267 contained on the support 260 and attached on an upper support member 268 attached beneath and to the stringer member 244. An identical construction is found in both the upper end and the lower end of the stringer member 244, there being at least two of the rocker-mountings 258 supporting each stringer 244.

Figures 11, 12, 15:
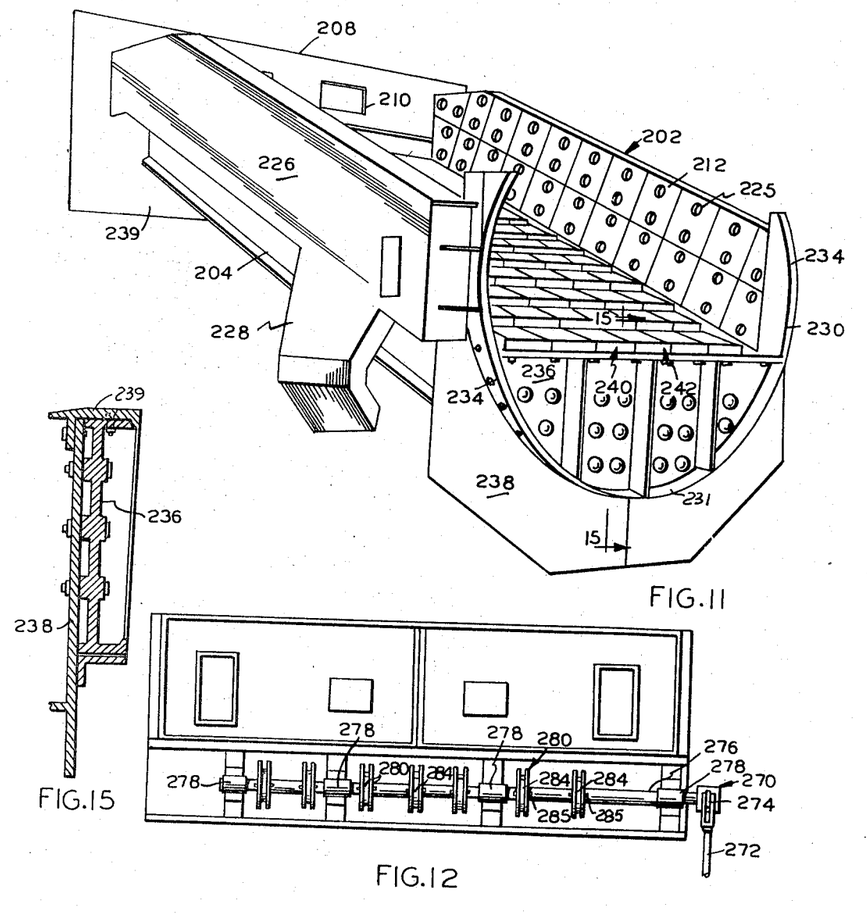
FIG. 11 is a perspective view of the ignition grate assembly.
FIG. 12 is a rear elevation view of the rear drive portion for the ignition grates.
FIG. 15 is a cross-sectional view of the ignition grate discharge castings taken substantially along line 15—15 in FIG. 11.

The drive assembly 270 for all of the movable stringers 244 and ignition grates 242 is shown celarly in FIGS. 12 and 13 and comprises a drive arm 272, which receives power from a drive cylinder and piston arrangement (not shown) or any source of power. Drive arm 272 has a crank 274 pivotally attached thereto which reciprocates to translate motion in a forwardly and rearwardly direction to drive a shaft 276 supported on bearings 278 on the ignition grate frame structure 204, 206. Shaft 276 has attached thereon a pair of drive bracket members 280, there being one pair for each of the movable ignition grates 242. Each pair of brackets 280 has a connecting arm 282 attached pivotally by a pivot pin and is attached to the movable stringer 244 by means of a pin and eye arrangement 283. A sleeve 284 is keyed to shaft 276 and is pivotally attached to the bracket 280 by a shear pin 285.

According to the drive arrangement 270, each movable stringer 244 with the grates 250 mounted thereon, is driven independently of all of the others by means of the independent drive bracket 280 and shear pin and drive arm arrangement 285 which connects the drive shaft 276 with a respective stringer 244. Therefore, if for any reason, any stringer 244 should become disabled or jammed or otherwise inoperative, it would either cease to function or would shear its own individual shear pin 285, permitting the remainder of the movable stringers 244 to function normally. At some time a broken shear pin 285 can be replaced and the source of the trouble can be located and corrected. Each movable stringer 244 and the ignition grates 250 are provided with a particular arrangement of wear shoes and wear means to absorb the wear and this will now be described.

An alternative and modified form of support for the stringer 244 is shown by FIGS. 15 and 16 as a wear shoe support 285. Each moving stringer 244 has attached on the underside thereof a bracket 286 which is pivotally attached by a pivot pin 288 to a flat, elongated wear shoe 290 having downturned edges 292 thereon which fit over a support block 294. Support block 294 has a depending lug 295 thereon which fits in a pair of protruding lugs 296 attached to a support plate 297 bolted to another plate 298, which is welded to a channel 299 attached on the bottom of the support frame 204, 206 of the ignition grate structure. Plate 297 is bolted to plate 298 by a pair of bolts 300 fitting in elongated slots on the plate 297.

A projecting plate 302 welded to the channel 299 has a pair of adjustment bolts 304 placed therein which engage and bear against a projecting portion of the plate 297 whereby adjustment pressure may be applied to the entire plate structure 297 in order to adjust the inclination thereof at the same time or independently of adjusting the position of plate 297 with respect to 298 so as to cause an alignment and an adjustment to compensate for the wear which has taken place between the wear shoe 290 and the support block 294.

Since the elongated stringer 244 is pivotally attached on the elongated wear shoe 290 which slotably fits over support block 294, the reciprocating movement of the beam 244 is transferred to the top of the block 294 by the sliding shoe 290 and the friction wear takes place at this point. Compensation is made for this from time to time by adjusting the bolts 300, the adjustment screws 304 by virute of all of which the shoe 290 may be brought into firmer contact with the block 294.

Figure 18:
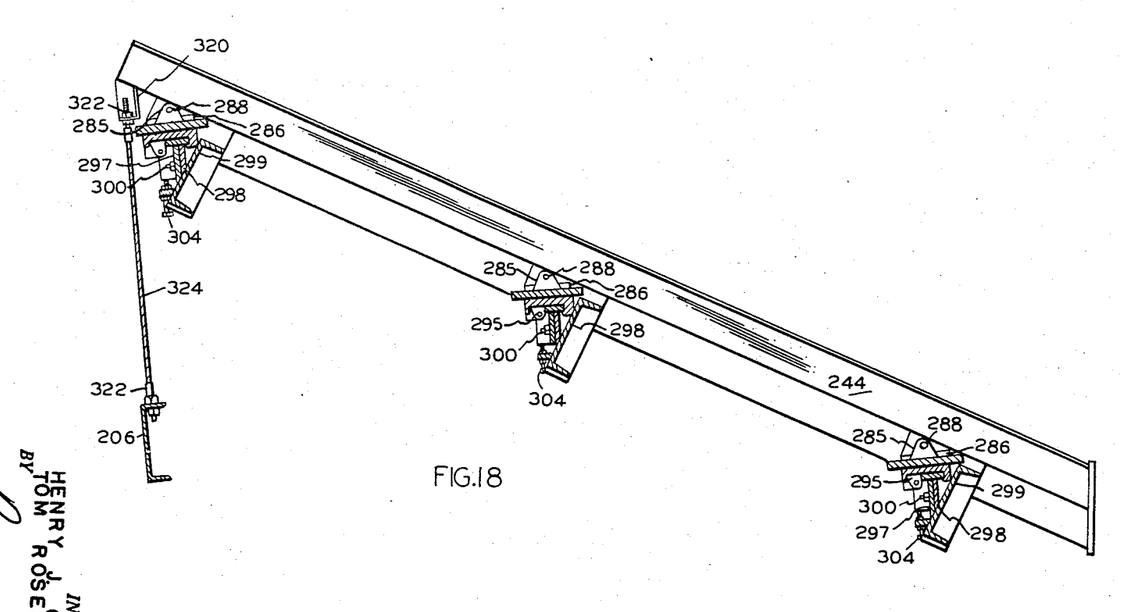
FIG. 18 is a vertical cross-section view through a modified form of the ignition grate movable stringers showing the modified wear support therefor.
Figure 19:
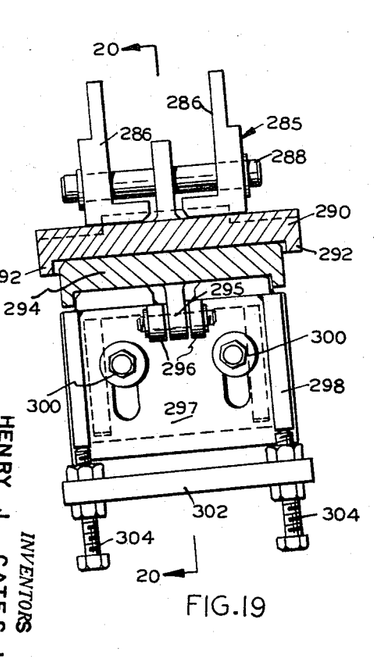
FIG. 19 is an enlarged detail rear elevation view of one of the wear supports shown in FIG. 18, tilted out of normal vertical position by a straight line projection from the left side of FIG. 20.
Figure 20:
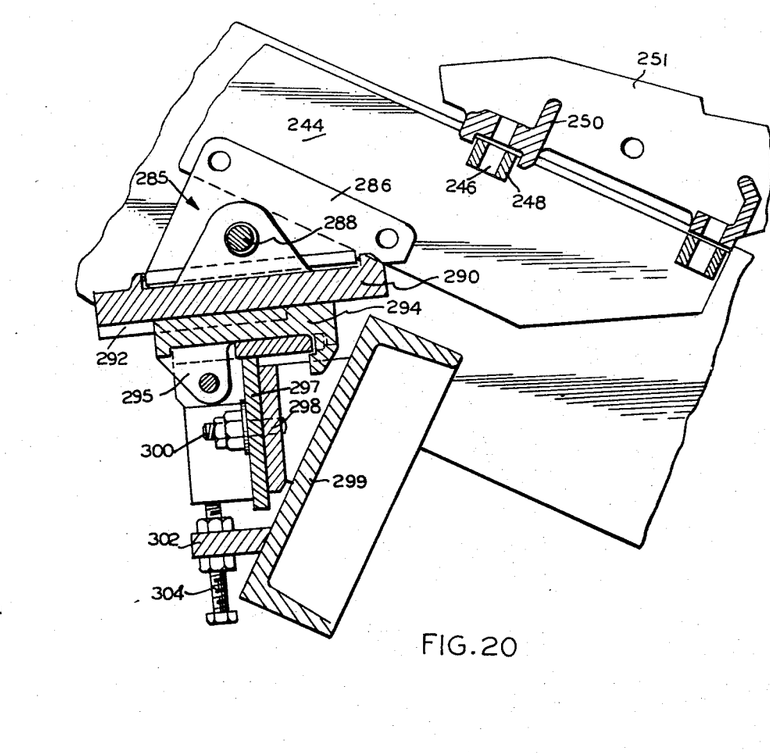
FIG. 20 is a cross-sectional view taken along the line 20—20 in FIG. 19.

In the modified form of support for the stringers 244 shown in FIG. 18, each stringer 244 has attached at the top underside thereof a bracket 320 to which is attached the bolt and nut fastener 322 on one end of a wire holddown member 324 attached by a second bolt and nut fastener 322 with one of the cross-frame members 206 of the ignition grate support structure. When the stringer 244 and grate structure thereon, is in its uppermost position of sliding on wear supports 285 the cable holddown member 324 is not under much tension but the tension thereon increases as the stringer moves downwardly thereby pulling downwardly on the top of the stringer 244 preventing it from rising appreciably. In other words, the stringer 244 is held to travel as much as possible in a straight line.

Rotary kiln

According to the previous description of the method and apparatus, the rotary kiln 400 receives the burned refuse from the incinerator ignition grates 202 and completes the combustion of this material, reducing it to a fine ash. Kiln 400 is an elongated, cylindrical affair which is supported for rotation about its central longitudinal axis by means of supports 402, 404 attached to a rotary kiln support independent of the building structure and rotatably supporting the shell 406 of the kiln 400. In addition, a particular type of support and seal 408 supports the outer or discharge end of the kiln while another arrangement of seal and girth gear support 410 supports the entrance end of the kiln 400 and retains said kiln 400 and shell 406 in communication with the discharge casting 230 on the ignition grates to receive the burned refuse therefrom.

Figure 21:
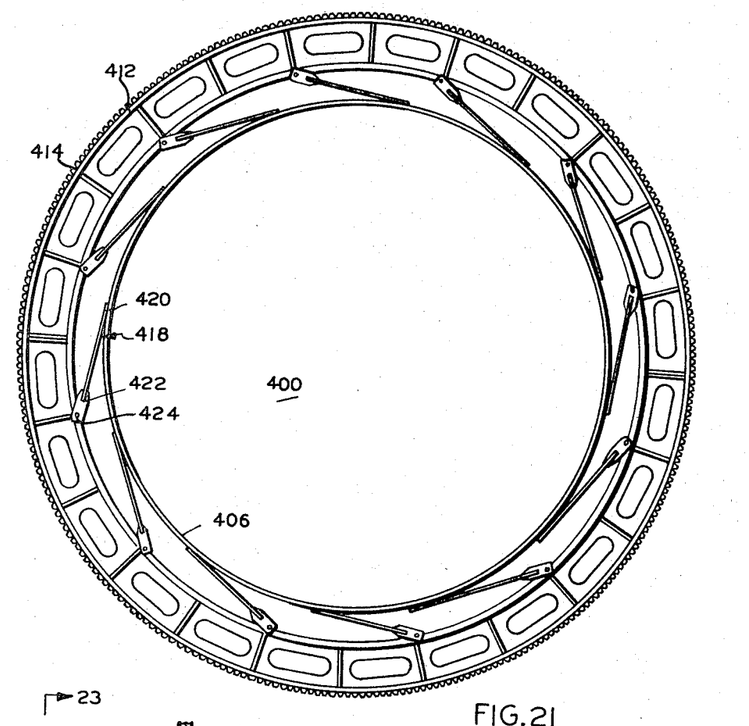
FIG. 21 is an end elevation view of the special mounting of the girth gear of the rotary kiln.

The special mounting feature of the girth gear and seal arrangement 410 is particularly noteworthy and will be described now in detail. In FIG. 21, the shell 406 of the kiln 400 has surrounding it and arranged in concentric alignment, an outer girth gear 412, having teeth 414 about the periphery thereof and receiving from a power driven drive gear (not shown) a continuous gear driving relationship which is designed to turn the cylindrical, rotary kiln 400. Because of the heat generated inside of the rotary kiln 400, the steel shell 406 has the tendency to expand and contract. To keep a constant, even meshing of the drive gear and girth gear 412, it becomes important to employ some method of compensating for the fluctuation of the kiln shell 406.

Figures 22, 23:
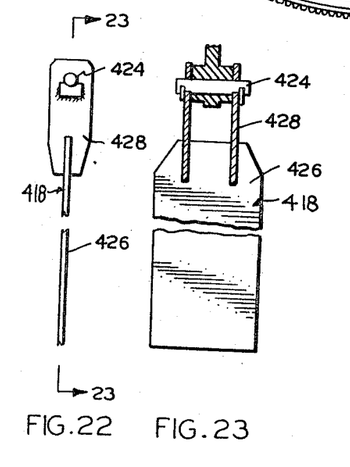
FIG. 22 is an enlarged detailed view of one of the spring plate mounting devices for the girth gear mounting shown in FIG. 21.
FIG. 23 is a cross-sectional view of the spring plate mounting taken substantially along line 23—23 in FIG. 22.

A plurality of spring plate mounting assemblies 418 are attached with one end 420 thereof to the shell of the kiln 406 and having the other end thereof, 422, pivotally attached by a pin 424 to a position inside of the girth gear 412. Reference to FIGS. 22 and 23 discloses that each of the assemblies 418 consist of an elongated bar or strap member 426 having one end thereof welded to a bracket assembly 428 having the pivot pin 424 attached therein. The other end of the bar 426 is welded to the shell of the kiln 406 at a diagonal position from the position of pin 424 on the girth gear 412. The girth gear 412 drives the kiln 400 through the connection made by the pivotal attachment of the bar 426 from its position on the inside of girth gear 414 to its welded position on the shell of the kiln 406. However, when the shell 406 expands or contracts, the expansion and contraction is of no serious consequence, since it is, in effect, absorbed or compensated by an equal movement of the bars 426 about their respective pins 424. This eliminates or substantially reduces the warping and destruction of the shell 406 from the changes in temperature.

This discharge end at 408 of the kiln 400 employs a particular advantageous arrangement of discharge casting 432 for rotatably supporting and attaching the end of kiln 400 in the opening in the wall through which the kiln discharges the ash and burned residue.

Figure 24:
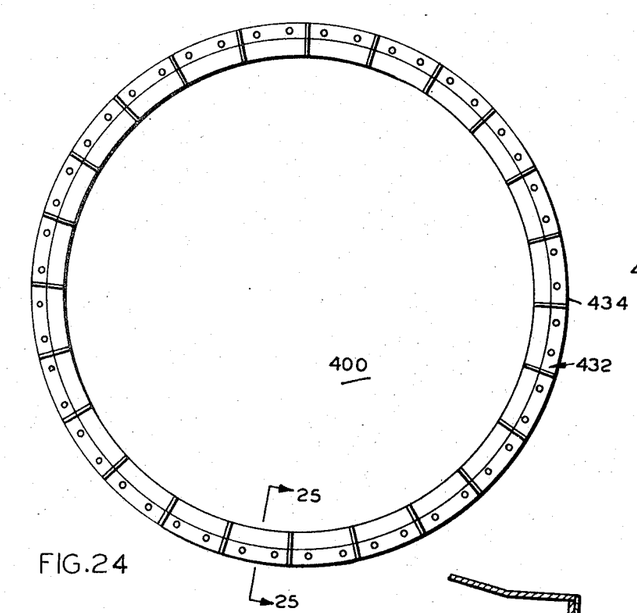
FIG. 24 is a front elevation view of the nose ring casting of the rotary kiln.
Figure 25:
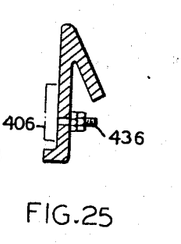
FIG. 25 is a cross-sectional view of the nose ring casting taken substantially along lines 25—25 in FIG. 24.

The terminal end of the kiln 400 is provided with a plurality of the nose ring castings 434 arranged in radial relationship and forming a complete closed circle on the end of the kiln. Each of the castings 432 is independent of the other and may be removed from the kiln by unscrewing a bolt assembly 436 which retains the individual nose ring castings 432 in place on the end of the kiln 406.

Mixing chamber

Figure 26:
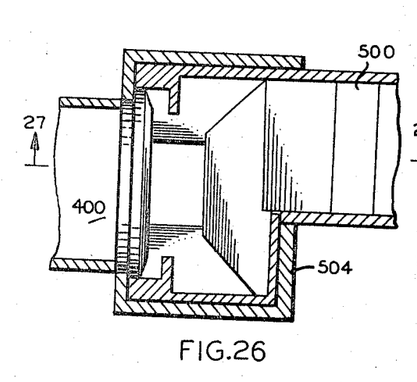
FIG. 26 is a diagrammatic, perspective view of the mixing chamber used with the rotary kiln.
Figure 27:
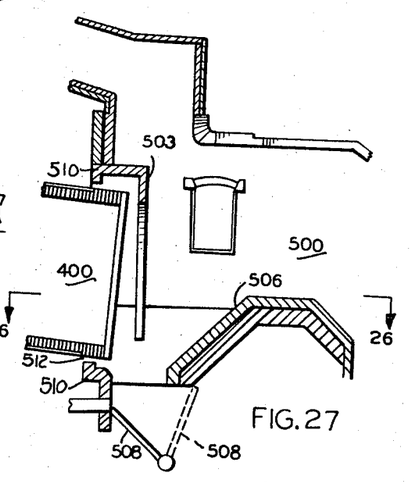
FIG. 27 is a cross-sectional diagrammatical view of the mixing chamber shown in FIG. 26 in conjunction with a diagram of the end of the rotary kiln.

The mixing chamber shown in FIGS. 26 and 27 is represented generally by the number group "500" and as is seen in FIG. 1, the mixing chamber assembly 500 receives the residue and ash from the end of the rotary kiln 400. FIGS. 26 and 27 are diagrammatic views in reduced size in order to shown the particular relationship of the mixing chamber and in conjunction with the end of the rotary kiln 400. A hood arch arrangement 503 extends from an attached position above the end of the rotary kiln 400 and downwardly in front of the kiln 400 to protect the discharge end castings 432 of the rotary kiln from the reflected heat of the mixing chamber 500. The particular arrangement of the offset wall 504 acts as a baffle to cause turbulence of the gases as they pass out of the rotary kiln 400. A bridge wall 506 acts as a baffle and deflector and as a deflector, it directs gases from the end of the rotary kiln 400 back toward the gas flow from the rotary kiln, thereby aiding in producing turbulence in the mixing chamber. Proper turbulence within the mixing chamber is essential for proper mixing of the combustion and bypass gases and for complete combustion.

A plate seal 510, part of the mixing chamber that encases the outlet end of the rotary kiln, employs the unique feature of a small gap 512 in the circular plate seal 514 which allows cool air to be let in around the discharge castings and in conjunction with the particular shape of the hood arch 503 aids in protecting these castings from extensive heat.

The siftings hopper 600, located under the drying grates 102, as mentioned in connection with the ignition grates 200, comprises an open-top, elongated hopper 602 with a closed bottom 604. A power driven screw conveyor 606 conveys the droppings and sifting from the drying grates 100 onto the top and rear of the ignition grates 200.

A water seal chamber 700 beneath the ignition grates 200 is filled with water to the approximate water line shown in FIG. 1. It has submerged therein the entrance end of a long trough 704 having a long screw conveyor 706 therein. The purpose of this is to collect small hot ash that falls through the ignition grates stringers 240, 242 and to quench the ash as it falls into the screw conveyor 706 by which it is conveyed to the diversion gate housing 502 at which point it falls into residue conveyors (not shown). The water seal in chamber 700 maintains the constant pressure of the air that is blown under the grates 200 by the force draft duct system in the ducts 226 and 228. The hopper eliminates manual collection of the ash and constantly reinjects the ash into burning process.

While we have shown and described a particular embodiment of our invention and a particular description of the method and apparatus employed in the instant incinerator, this is but one form of our invention having typical characteristics and being for descriptive purposes mainly and is not to be construed as any sort of limitation on the scope of our invention, since various alterations, substitutions, changes, eliminations, revisions, and modifications may be made in the embodiment shown and described and in the method presented without departing from the scope of our invention set forth in the appended claims.

We claim:

1. In a rotary kiln for an incinerator wherein there is continuous incineration of refuse continuously moving therein and wherein the kiln receives the refuse from a previous incinerator operation and further burns the refuse as it passes therethrough, an elongated, kiln shell supported for rotation about its longitudinal axis, a girth gear surrounding said kiln shell, and a plurality of elongated members having one end of each one thereof pivotally attached to one of said girth gears and the other end thereof rigidly attached to a point on said kiln shell circumferentially spaced from the point of attachment on said girth gear.

2. In a rotary kiln for an incinerator wherein there is continuous incineration of refuse continuously moving therein and wherein the kiln receives the refuse from a previous incinerator operation and further burns the refuse as it passes therethrough, an elongated, cylindrical kiln shell supported for rotation about its longitudinal axis, a girth gear surrounding said kiln shell, a plurality of elongated bar members having one end of each one thereof pivotally attached to said girth gear and the other end thereof rigidly attached to a point on said kiln shell spaced from the point of attachment on said kiln shell.

References Cited by the Examiner

UNITED STATES PATENTS

| | | | |
|---|---|---|---|
| 2,015,842 | 10/1935 | Christensen | 110—15 X |
| 2,037,990 | 4/1936 | Martin | 110—165 |
| 2,122,314 | 6/1938 | Fields | 110—118 |
| 2,167,653 | 8/1939 | Holbrook et al. | 110—118 |
| 2,169,512 | 8/1939 | Borch | 263—33 |
| 2,269,273 | 1/1942 | Krogh et al. | 110—8 |
| 2,809,024 | 10/1957 | Simon | 263—32 |
| 2,879,862 | 3/1959 | Burden | 23—277 |
| 2,904,322 | 9/1959 | Bruff | 263—32 |
| 2,999,396 | 9/1961 | Kaczmarski | 34—108 X |
| 3,042,389 | 7/1962 | Gieskieng | 110—14 X |

FREDERICK L. MATTESON, Jr., *Primary Examiner.*

H. B. RAMEY, E. G. FAVORS, *Assistant Examiners.*